April 22, 1941.                 D. L. LOETSCHER                 2,239,008
                            METHOD OF FOOD PROCESSING
                            Filed April 6, 1939
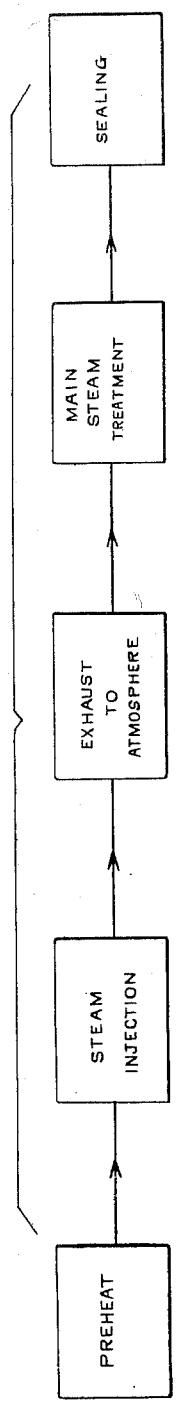
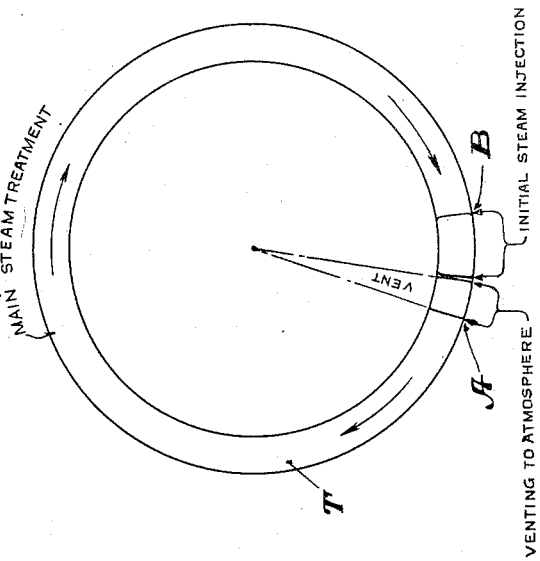
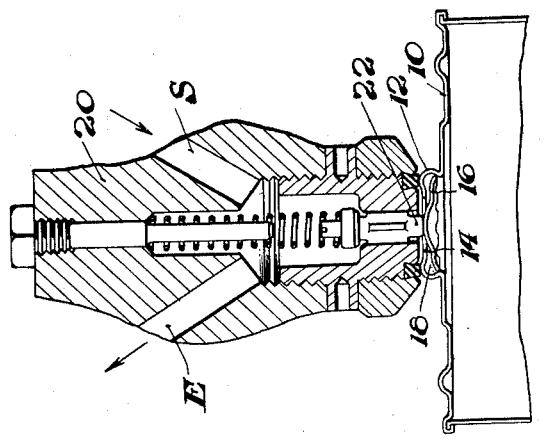
Inventor
*David L. Loetscher.*
By *Cushman, Darby & Cushman*
Attorneys Patented Apr. 22, 1941

2,239,008

UNITED STATES PATENT OFFICE 2,239,008

METHOD OF FOOD PROCESSING

David L. Loetscher, Philadelphia, Pa., assignor to Crown Can Company, Philadelphia, Pa., a corporation of Pennsylvania Application April 6, 1939, Serial No. 266,367

9 Claims. (Cl. 99—182)

The present invention relates to the processing of products in containers, particularly containers such as metal cans of the valved type.

Heretofore, products such as foods have been processed in valved containers by vacuumizing the containers through their valves to remove air from the head space thereof, thereafter supplying steam under pressure to the containers through their valves for a period of time necessary to properly treat the product, and then discontinuing the application of steam to permit the pressure in the container to close the valve. Various food products have been thus treated in valved containers, such as fruits and fruit juices, vegetables and vegetable juices, and milk and milk products.

To properly treat different food products, it is necessary to remove substantially all of the air from the container prior to the steam treatment. Heretofore, this air has been preliminarily removed by the above mentioned step of vacuumizing the containers through their valves. It has been found, however, that there are serious practical inconveniences incident to the vacuumizing step, for the degree of vacuumization must be accurately regulated with relation to the temperature of the product.

For instance, if an established degree of vacuumization is applied, and the temperature of the product is too high, the contents of the containers may boil and foam outwardly through the valve. Similarly, if the degree of vacuumization is too high, with an established temperature of the product, the same undesirable boiling over may take place.

On the other hand, if the degree of vacuum applied is too low for an established temperature of the product, air may be left in the container with resulting impairment of the subsequent steam treatment of the product. Similarly, if an established degree of vacuum is applied, but the temperature of the product is too low in relation thereto, again a substantial amount of air may be left in the container. The presence of air in the container is undesirable from the standpoint of the stability of the product after the can is finally sealed. It is further undesirable as its presence may prevent the product from reaching the desired final temperature during the main steam treatment, for the air may build up sufficient back pressure to prevent proper flow of steam into the container.

A principal object of the invention, therefore, is to eliminate from the existing practice the step of vacuumizing the containers, while still providing for the removal of substantially all of the air from the containers prior to the treatment of the product.

Another object of the invention is to provide for thus removing substantially all of the air from the containers without causing the product to boil up through the container valves. Ancillary to this objective, a method of removing the air is provided which does not require as close control of the temperature of the product with relation thereto as in the methods of the prior art.

Another object of the invention is to provide a process which permits preheating a particular product to any desired temperature over a wide range, without requiring accurate adjustment of the means for removing air from the container.

In the drawing, which is diagrammatical and not intended to restrict the invention to any particular steps of the process, or the use of any particular apparatus—

Figure 1 is a schematic view illustrating a sequence of steps within which the invention is included.

Figure 2 is a diagrammatical view of a treating head showing its manner of application to a container of the valved type.

Figure 3 is a diagrammatical circular chart showing approximate periods of the treatments involved in the invention.

The method of this invention is primarily concerned with the treatment of food products in containers of the type illustrated in the patents to Fenn, No. 1,728,533, September 17, 1929, and Ford, No. 1,963,782, June 19, 1934.

These valved containers may be employed in various ways in the processing of food products therein, for instance, as described in the patents to Mills, Nos. 2,054,092 and 2,054,093, September 15, 1936, the patents to Ayers et al., Reissue No. 20,578, December 14, 1937, and No. 2,054,065, September 15, 1936, and the patent to Mills, No. 2,145,268, January 31, 1939.

Referring to Figure 2, the valved container referred to herein may be an ordinary can provided with a top end 10 having at the center thereof a port member comprising a raised portion 12 surrounding an opening 14. A valve disc 16 is mounted within the port member 12 for limited vertical movement therein. The raised portion 12 is slightly constricted below the disc 16, to retain said disc therein. When the disc 16 is moved toward the opening 14, it seats in valve or port-closing position, and the formation of a seal is assisted by the presence of a suitable rubber composition material disposed in the annular depression 18 within the raised portion 12 surrounding the opening 14. The periphery of the disc 16 is notched, as shown in the aforesaid patents to Fenn and Ford, to permit flow of fluid past the disc and through the opening 14 when said disc is in open or unseated position.

Heretofore, when the contents of a given container, provided with a valve structure as described above, was processed by steps including removal of the air within the container by vacuumization, followed by admission of steam into the container, a suitable conduit assembly or head 20 was brought into sealing contact with the raised portion 12, and the disc 16 was held in open position while the air was removed from the head space of the container. This was done by applying a source of vacuum for example to the outlet port E in the head 20. During vacuumization, the valve 16 was maintained in its lower or open position by the extension 22 depending from the valve member of the head 20, all as shown and described in the aforementioned patents to Mills, Nos. 2,054,092 and 2,054,093.

After vacuumization, steam was admitted into the conduit assembly or head 20, as, for instance, through the inlet port S, forcing the valve disc 16 to its open position to permit the steam to enter the container. After the contents of the material had been suitably processed with steam, the valve disc 16 was permitted to move into closed position by differential pressure, this differential being brought about for instance by movement of the head 20 away from the can, permitting internal pressure within the can to move the disc 16 to seated position. While the disc was thus maintained in seated position, it was locked in such position by crimping the member 12 beneath the disc 16, thereby forcing the disc firmly to its seat, closing the opening 14 and permanently sealing the valve and container.

In thus practicing the steps of processing the valved containers and products within the same in the manner of the prior art, it was necessary to rather delicately regulate the degree of vacuum applied to remove the air, with relation to the temperature of the product when the container was applied to the device for effecting the vacuumization. For instance, preheating the food in the containers was known to be desirable before finally subjecting it to the direct steam treatment, as described above. This preheating serves to separate some of the air from the product, reduces the time required for finally heat treating the product, drives off gases contained in the product, and decreases condensation resulting from the direct application of steam within the containers.

In processing such foods as fruits and vegetables, for instance, it has been found to be desirable to vary the degree of preheating over a wide range of temperatures depending on the particular product being treated. For example, it is desirable to preheat fruit juices to approximately 110° F., (although a lower degree of preheat may be employed), while it may be desirable to preheat vegetables from approximately 180° F. to 210° F. With such a desirable wide range in preheating different products, it was necessary to vary the degree of vacuum applied to the containers, for with a relatively high preheating temperature, an established degree of vacuum would be excessive and would cause the contents of the can to foam out through the valve into the treating head, thus decreasing the quantity of food in the can, in addition to, perhaps, fouling the treating head or like device. Similarly, if the product was preheated to a relatively lower temperature, not all of the air would be removed from the head space of the can by the application of the established degree of vacuum. Consequently, when the particular container was treated for a given period of time with steam, the final temperature of the product at the end of the steam treatment would be lowered, and the product might, therefore, not have been treated to the desired extent.

The disadvantages of the prior art methods, wherein the vacuumization step was employed, is apparent from a consideration of the commercial machines on which this method was practiced, for instance, as shown in the above mentioned patents to Mills. In operating these commercial machines, the filled and preheated valved containers are fed onto platforms on a turret rotating in a vertical plane, with their valved ends uppermost. Each container is then engaged with its particular header of a general type similar to that of Figure 2, the valve disc of the can is held open, and during initial rotation of the turret, the vacuum is applied. Thereafter, as the turret rotates and thereby moves the can toward upside down position, steam is admitted into the can and the treatment of the contents with steam continues throughout the remainder of the cycle of rotation of the turret. In these machines, therefore, there is a relatively fixed period during which steam is injected, and the machine is designed and adjusted to apply steam to containers having substantially no air remaining therein. If a sufficient quantity of air should remain in the containers, its presence prevents the temperature of the product from being raised to the desired optimum during the steam treatment.

It will be understood that the advantages of the method of the present invention are not confined to any particular type of machine such as those referred to herein. The practice of the method is advantageous in association with other apparatus having the same problem, such as later developed machines similar to those mentioned above, but in which the containers are carried on a turret rotating in a horizontal plane, and are inverted thereon for steam treatment.

In machines of the type disclosed in the aforementioned Mills patents, the application of steam and vacuum was relatively fixed, depending on the design and adjustment of the machine. As the degree of vacuumization had to conform to the temperature of the product resulting from preheating, obviously, the preheating had to be accurately regulated. As previously pointed out, if the temperature of preheating was too high, boiling up of the product was the probable result. If the degree of preheating was too low, air remaining in the container varied the final steam treatment to a marked degree.

The method of the present invention eliminates the necessity for accurately regulating the degree of preheating of the product to conform with the design and adjustment of the treating machine. In the process of the present invention, the step of vacuumization is eliminated, and in place thereof, a quantity of steam is preliminarily injected into the head space of the can for a relatively short period of time, and this quantity of steam is quickly permitted to relieve through the valve of the container, carrying the undesirable air therewith. Thereafter, steam under pressure is supplied to the container through its valve for a relatively longer period of time, to treat the product in the container, and the pressure of this steam thereafter serves to move the container valve disc to closed position.

The sequential steps of a method of treating products within valved containers are illustrated diagrammatically in Figure 1.

The containers are, of course, first filled with the product to be treated, preferably before application of the valved end 10 to the container. In filling containers, there usually remains a small head space in the container above the product, which becomes filled with air.

After application of the top valved end 10, it is usually desirable to preheat the product, although the practice of the method of the present invention is not confined to cases where preheating is employed. The desirable degree of preheating may vary over a wide range, depending on the product being treated, and other conditions. As pointed out above, this range may be from 110° F. or lower in the case of fruit juices, to approximately 210° F. in the case of vegetables. The preheating step serves to drive off gases contained in the product, reduces condensation in the container when steam is later applied both during injection of steam for removal of air and during application of steam for treating the product, thus reducing dilution of the product, and shortens the time required to bring the product to the desired temperature in the main steam treatment.

After preheating, if this step is employed, steam is injected into the head space of the container through its valve. This injection need only be for a short period of time. For instance, it has been found that the injection time need only be about one second when the product has been preheated to approximately 180° F. This time may vary, depending on circumstances. For instance, if only a very low degree of preheat is used the injection time may have to be somewhat increased, up to perhaps three seconds, to accomplish the same results. The time of this injection may be varied, of course, as required. The controlling factor during this step is to inject sufficient steam to create a pressure adequate, when the can is subsequently opened to atmosphere through its valve, to eliminate substantially all of the air from the head space. Consequently, the period of preliminary steam injection and the volume of steam introduced will vary for different sized containers. The steam injection should be controlled, of course, to prevent raising the temperature of the product to an extent sufficient to cause objectionable boiling when the container is opened to atmosphere, resulting in difficulties comparable to those experienced with the vacuumizing step used in the prior art. However, it is not difficult to prevent such boiling when using this steam injection step. The volume of steam introduced may be varied, to some extent, with the temperature of the product. For instance, if the product has been preheated to an extent sufficient to create a substantial amount of vapor, this vapor will have eliminated some air.

After a pressure has been thus built up in the head space of the container, the steam is quickly and instantaneously exhausted to atmosphere by discontinuing the steam injection and opening the head space of the container to atmosphere. The container valve may be held open at this stage to permit the steam and air to instantaneously exhaust therethrough. This quick release of steam pressure from the head space of the container occurs with substantial force, carrying with it the head space air which has previously become mixed with the steam. Since the steam has heated and expanded the air, the air expansion alone assists in the discharge of air from the head space, resulting in substantially complete removal of air from the head space. The heating of the product at, or near, its surface by the injected steam, creates some vapor which also tends to drive air from the head space.

The product is left in communication with atmosphere only momentarily, for only very little exposure is necessary to cause all of the air to be swept from the head space. Communication of the head space with the atmosphere is cut off before air is permitted to filter back into the head space. Boiling of the contents is prevented by regulation of the period of steam injection.

In addition to the advantage of eliminating necessity for accurate regulation of the temperature of the product with relation to the degree of vacuumization, as in the prior methods, the present method of removing air has other advantages. For instance, in practicing the prior methods with a machine of the Mills type, as referred to above, if there should be on the machine a comparatively loose fit between the container lip 12 and the treating head, the vacuum applied would tend to draw cold air into the head around the lip where it engages the treating head of the machine, which would be exceedingly detrimental to the process. In practicing the method of the present invention, the steam pressure established in the head and injected into the container would resist the entrance of air between the container lip and the head under the conditions mentioned above, and any outward leakage of steam would be of no consequence.

Following the exhausting of the steam and air from the head space of the container, steam is immediately passed into the container through its valve for treating the product as described in the above mentioned Mills patents, for a period of time which varies with the product being treated, to raise the temperature of the particular product to the desired degree. The details of this main steam treatment, including temperatures to which products should be raised, are discussed in the above mentioned patents to Mills and Ayers et al.

It is sufficient here to say that the product is agitated during the treatment so that the steam treats all parts thereof, and the treatment is continued for a period of time necessary to bring the particular product to the desired temperature. When the steam treatment is discontinued, the pressure of steam within the container moves the valve disc to closed position, after which the valve and container is sealed in any desired manner, for instance as described in the above mentioned Mills Patent No. 2,054,092. The container and product may then be cooled, if desired, by such means as immersion or cold water spray.

The method of the present invention is also illustrated in Figure 3. The sector marked "Initial steam injection" designates the beginning of the cycle, and it is during this time that the contents of the can are first opened to steam injection for a very short period of time. The succeeding operations occur following the diagram clockwise, and it will be noted that the next operation is indicated by a short sector indicated as "Vent." This indicates the short period of time in which the steam previously preliminarily injected into the container is permitted to exhaust and carry the air from the head space of the container. Thereafter, as shown by the remainder of the cycle from point A to point B, the contents of the container are subjected to the steam treatment.

Figure 2 is merely illustrative of an apparatus which could be employed to practice the method of the present invention. When the container is initially presented to the header 20, the lower end of the header makes sealing contact with the central portion 12 of the container, and the container engages the valve extension 22 depending from the header, causing valve disc 16 to be depressed to maintain the valve in open position. Thereafter, steam is preliminarily admitted to the container through the inlet port S. The inlet of steam is continued for only a short period of time, for instance, from one to three seconds, depending on circumstances, and produces very little condensation within the container. At the termination of this short steam injection port S is closed, and an exhaust port E is opened. This exhaust port opens to atmosphere. As the depending member 22 on the header holds the valve disc 16 depressed, the steam previously injected into the head space of the container can relieve therefrom and exhaust to atmosphere through the port E. The time of exhaust is also very short, being only sufficient to permit substantially all of the previously injected steam then in the head space, and substantially all of the air in the container to leave the same, after which the port E is again closed, and the port S opened, permitting the steam to enter the container through the valve and penetrate throughout the contents of the container to treat the same. This steam builds up a considerable pressure within the container, and continues until the contents of the container has been brought to the desired temperature, depending on the product being treated. Thereafter, the container is removed from the header, and the pressure of steam therein causes the valve to close in a manner well known in the art. The container valve is then sealed by crimping the circular portion 12 thereof beneath the valve disc 16, thus sealing the steam under pressure within the can. This steam later condenses, either by natural or artificial cooling, causing a desired vacuum condition within the container.

While not required in the method of this invention, it is desirable to practice the same in association with devices for changing the position of the container, for instance, in association with machines of the type disclosed in the above mentioned Mills Patents Nos. 2,054,092, 2,054,093, and 2,145,268.

Referring to Figure 3, and assuming that T represents a turret rotating on a horizontal axis, as in the above-mentioned Mills patents, the containers are fed into the machine in upright position at the lower end of the path of travel of the turret within that arc marked "Initial steam injection." As soon as the containers are placed on the turret, they are brought into contact with the header and their interiors are opened to communication with the source of steam pressure, indicated by the port S in Figure 2. The turret is, of course, rotating, and while the containers are in substantially upright position, they are passed through the area marked in Figure 3 "Venting to atmosphere." As represented, this venting treatment is only for a short period of time, and takes place while the containers are in substantially upright position, the previously injected steam exhausting through the port E of Figure 2, while the port S is closed. Thereafter, as the turret rotates, the containers are gradually being brought to an inverted position, and when completely inverted, continued rotation of the turret gradually brings them back to upright position. Between points A and B of Figure 3, and while the container is being inverted, is inverted, and while being returned to upright position, the main steam treatment takes place, the turret having means for closing port E of Figure 2 and opening port S thereof at point A so that steam is supplied to the container throughout the major portion of the cycle of operations to treat the product with steam, as previously described.

The diagram of Figure 3 may also represent a turret T rotating on a vertical axis. In this case, the same cycle of operations takes place, the container being in upright position during the areas of "initial steam injection" and "venting to atmosphere" but being inverted during the main steam treatment represented by that portion of the diagram between the numerals A and B. In this type of machine the turret has some means at A to invert the containers in preparation for the main steam treatment. A machine of this type for practicing the method of this invention is disclosed in the copending application of John Mills, Serial No. 283,115, filed July 6, 1939.

It will be apparent that the process of this invention is a marked improvement over the methods of the prior art. The inconvenient vacuumizing step has been eliminated, and yet the invention supplies a way to eliminate substantially all of the air from the valved containers prior to the main steam treatment. In the old methods, a variation of a few degrees in the preheating of the product was sufficient to upset the vacuum preheat relationship and cause trouble. It was necessary for those practicing the process to maintain a delicate balance between those two factors at all times. The necessity for the maintaining of this delicate balance is eliminated by the method of the present invention and therefore those delegated to practice the process need not be as carefully trained as heretofore. In the practice of the present invention, the degree of preheat for various products can vary over a relatively wide range, and the boiling out of the contents of the valved containers is entirely eliminated.

It will be apparent that various changes may be made in the method disclosed herein without departing from the invention.

I claim:

1. The process of treating products within valved containers, which includes the steps of injecting steam into the head space of the container through the valve for a relatively short period of time, permitting the steam so injected to exhaust from the head space of the container to remove the air therefrom through the valve, and passing steam through the valve into the container and through the product therein for a relatively longer period of time to treat the product in the container.

2. The process of treating valved containers and products within the same, which includes the steps of injecting steam into the head space of the container through the valve, holding the valve open and permitting the steam so injected to exhaust with entrained air from the head space of the container through the valve, and immediately thereafter passing steam through the valve into the container to treat the product therein while preventing entrance of air into the head space of the container, and sealing the valve.

3. The process of treating valved containers and products within the same, which includes the steps of injecting steam into the head space of the container through the valve, holding the valve open and permitting the steam so injected to exhaust from the head space of the container through the valve while preventing the return of air to the head space of the container, thereafter passing steam through the valve into the container to treat the product therein and build up pressure within the container, and permitting the pressure so built up to close the valve.

4. The process of treating valved containers and products within the same, which includes the steps of injecting steam into the head space of the container through the valve, holding the valve open and permitting the steam so injected to exhaust with entrained air from the head space of the container through the valve, passing steam through the valve into the container and through the product therein to treat the same and build up pressure within the container, permitting the pressure so built up to close the valve, and sealing the valve.

5. The process of treating various food products within valved containers, which includes the steps of preheating the container and product to the desired temperature depending on the product being treated, injecting steam into the head space of the container through the valve for a relatively short period of time, permitting the steam so injected to exhaust from the container to remove air therefrom through the valve, and passing steam through the valve into the container for a relatively longer period of time to treat the product in the container.

6. The process of treating valved containers and various food products within the same, which includes the steps of preheating the container and product therein to the desired degree depending on the product being treated, injecting steam into the head space of the container through the valve, holding the valve open and permitting the steam so injected to exhaust with entrained air from the container through the valve, passing steam through the valve into the container and through the product therein to treat the same and build up pressure within the container, permitting the pressure so built up to close the valve, and sealing the valve.

7. The process of treating containers having valved top ends and products within the same, which includes the steps of injecting steam through the valve into the head space above the product in the container, and permitting the steam so injected to exhaust from the container to remove air therefrom through the valve, while the container is in substantially upright position, and passing steam through the valve into the container to treat the product therein while the container is in other than upright position.

8. The process of treating containers having valved top ends and products within the same, which includes the steps of injecting steam through the valve into the head space above the product in the container, and permitting the steam so injected to exhaust from the container to remove air therefrom through the valve, while the container is in substantially upright position, inverting the container and passing steam through the valve into the container to treat the product therein and build up pressure within the container, permitting the pressure so built up to close the valve, and sealing the valve.

9. The process of treating containers having valved top ends and products within the same, which comprises, applying a header having steam inlet and exhaust means to the container valve and in sealing engagement therewith, injecting steam under pressure into the head space of the container from the inlet means of the header for a relatively short period of time, permitting the steam so injected to quickly exhaust under its own pressure from the head space of the container through the valve and the exhaust means of the header to remove substantially all of the air from the head space of the container, immediately thereafter passing steam through the valve into the container from the inlet means of the header for a relatively longer period of time to treat the product in the container, without removing the header from sealing engagement with the container valve and while preventing return of air to the head space of the container through the valve, and sealing the valve with steam under pressure in the container.

DAVID L. LOETSCHER.